(12) United States Patent
Gao et al.

(10) Patent No.: US 12,299,264 B2
(45) Date of Patent: May 13, 2025

(54) INTERACTION METHOD, AND ELECTRONIC DEVICE AND STORAGE MEDIUM

(71) Applicant: Beijing Zitiao Network Technology Co., Ltd., Beijing (CN)

(72) Inventors: Ye Gao, Beijing (CN); Yinan Jia, Beijing (CN); Zhigao Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/356,731

(22) Filed: Jul. 21, 2023

(65) Prior Publication Data

US 2023/0359337 A1 Nov. 9, 2023

Related U.S. Application Data

(63) Continuation of application No. PCT/CN2022/072358, filed on Jan. 17, 2022.

(30) Foreign Application Priority Data

Jan. 21, 2021 (CN) .......................... 202110084193.3

(51) Int. Cl.
*G06F 17/00* (2019.01)
*G06F 3/0481* (2022.01)
*G06F 3/04842* (2022.01)

(52) U.S. Cl.
CPC ........ *G06F 3/04842* (2013.01); *G06F 3/0481* (2013.01)

(58) Field of Classification Search
CPC .......................... G06F 3/04842; G06F 3/0481
See application file for complete search history.

(56) References Cited

U.S. PATENT DOCUMENTS

| | | | |
|---|---|---|---|
| 9,680,923 B1* | 6/2017 | Jain | H04L 67/53 |
| 11,010,028 B2* | 5/2021 | Lu | G06F 3/04842 |
| 11,895,354 B2* | 2/2024 | Li | H04N 21/431 |
| 2018/0349494 A1* | 12/2018 | Zhao | G06F 16/634 |
| 2021/0240339 A1* | 8/2021 | Pamidi | G06F 9/453 |
| 2021/0349752 A1* | 11/2021 | Park | G06F 3/0483 |

(Continued)

FOREIGN PATENT DOCUMENTS

| | | | | |
|---|---|---|---|---|
| CN | 106528813 B | * | 12/2018 | ....... G06F 17/30029 |
| CN | 109960448 A | | 7/2019 | |

(Continued)

OTHER PUBLICATIONS

Han, Rui, et al., CN111242682A, English translation, filed Jan. 10, 2020, pp. 1-27. (Year: 2020).*

(Continued)

*Primary Examiner* — Laurie A Ries (57) ABSTRACT

An interaction method includes receiving a first trigger operation acting on a target control corresponding to a target work; and in response to the first trigger operation, displaying a target visual element at a preset display position corresponding to the target work and controlling the target visual element to move from the preset display position to a first target display position of a target identifier, where the target identifier is an identifier of a target publisher of the target work.

20 Claims, 6 Drawing Sheets

Receive a first trigger operation acting on a target control corresponding to a target work — S101

In response to the first trigger operation, display a target visual element at a preset display position corresponding to the target work and control the target visual element to move from the preset display position to a first target display position of a target identifier, where the target identifier is an identifier of a target publisher of the target work — S102

(56) References Cited

U.S. PATENT DOCUMENTS

| | | | | |
|---|---|---|---|---|
| 2022/0391047 A1* | 12/2022 | Zhao | ................... | G06F 3/04883 |
| 2022/0398786 A1* | 12/2022 | Qi | ....................... | G06F 3/04845 |
| 2023/0137492 A1* | 5/2023 | Zheng | ................ | G06F 3/04847 |
| | | | | 715/719 |
| 2023/0161471 A1* | 5/2023 | Yuan | .................. | H04N 21/4312 |
| | | | | 715/702 |
| 2023/0185444 A1* | 6/2023 | Liu | ....................... | G06F 3/0488 |
| | | | | 715/709 |

FOREIGN PATENT DOCUMENTS

| | | | | | |
|---|---|---|---|---|---|
| CN | 110636322 A | | 12/2019 | | |
| CN | 110825303 A | | 2/2020 | | |
| CN | 110898424 A | * | 3/2020 | ......... | A63F 13/2145 |
| CN | 305813136 S | | 5/2020 | | |
| CN | 111225226 A | * | 6/2020 | ......... | H04N 21/2187 |
| CN | 111242682 A | * | 6/2020 | ........... | G06F 3/0481 |
| CN | 111314204 A | | 6/2020 | | |
| CN | 306026886 S | | 9/2020 | | |
| CN | 112764612 A | | 5/2021 | | |
| CN | 110531905 B | * | 7/2021 | ......... | G06F 3/04817 |
| CN | 113301361 A | * | 8/2021 | ......... | G06F 3/04817 |
| WO | WO-2024169852 A1 | * | 8/2024 | ......... | G06F 16/4393 |

OTHER PUBLICATIONS

Guo, Jun-jie, CN225226A, English translation, filed Dec. 31, 2019, pp. 1-19. (Year: 2019).*

International Search Report issued Apr. 6, 2022 in International Application No. PCT/CN2022/072358, with English translation (5 pages).

First Office Action issued Dec. 14, 2021 in Chinese Application No. 202110084193.3, with English translation (15 pages).

Notice of Rejection issued Jun. 27, 2022 in Chinese Application No. 202110084193.3, with English translation (16 pages).

* cited by examiner

INTERACTION METHOD, AND ELECTRONIC DEVICE AND STORAGE MEDIUM

This is continuation of International Patent Application No. PCT/CN2022/072358, filed on Jan. 17, 2022, which claims priority to Chinese Patent Application No. 202110084193.3 filed with the China National Intellectual Property Administration (CNIPA) on Jan. 21, 2021, the disclosures of which are incorporated herein by reference in their entireties.

TECHNICAL FIELD

The present disclosure relates to the field of computer technology, for example, an interaction method and apparatus, an electronic device, and a storage medium.

BACKGROUND

Giving a like is a regular interaction function of multiple types of software and is generally performed in a single manner, which leads to the lack of fun and is unable to express the favorite degree of the user and satisfy the personalized requirements of the user, thereby resulting in poor user experience.

SUMMARY

The present disclosure provides an interaction method and apparatus, an electronic device, and a storage medium to provide a relatively interesting interaction manner for a user.

The present disclosure provides an interaction method. The interaction method includes the steps below.

A first trigger operation acting on a target control corresponding to a target work is received.

In response to the first trigger operation, a target visual element is displayed at a preset display position corresponding to the target work and the target visual element is controlled to move from the preset display position to a first target display position of a target identifier, where the target identifier is an identifier of a target publisher of the target work.

The present disclosure further provides an interaction apparatus. The interaction apparatus includes a trigger receiving module and a first response module.

The trigger receiving module is configured to receive a first trigger operation acting on a target control corresponding to a target work.

The first response module is configured to, in response to the first trigger operation, display a target visual element at a preset display position corresponding to the target work and control the target visual element to move from the preset display position to a first target display position of a target identifier, where the target identifier is an identifier of a target publisher of the target work.

The present disclosure further provides an electronic device. The electronic device includes one or more processors and a memory configured to store one or more programs.

The one or more programs, when executed by the one or more processors, cause the one or more processors to perform the preceding interaction method.

The present disclosure further provides a computer-readable storage medium. The storage medium stores a computer program which, when executed by a processor, causes the processor to perform the preceding interaction method.

DETAILED DESCRIPTION

Embodiments of the present disclosure are described hereinafter with reference to the drawings. The drawings illustrate some embodiments of the present disclosure, but the present disclosure may be implemented in various manners and should not be limited to the embodiments set forth herein. These embodiments are provided for the understanding of the present disclosure. The drawings and embodiments of the present disclosure are illustrative.

Steps described in method embodiments of the present disclosure may be performed in sequence and/or in parallel. Additionally, the method embodiments may include an additional step and/or omit the execution of an illustrated step. The scope of the present disclosure is not limited in this respect.

As used herein, the term "include" and variations thereof are intended to be inclusive, that is, "including, but not limited to". The term "according to" is "at least partially according to". The term "an embodiment" means "at least one embodiment". The term "another embodiment" means "at least one another embodiment". The term "some embodiments" means "at least some embodiments". Related definitions of other terms are given in the description hereinafter.

Concepts such as "first" and "second" in the present disclosure are used to distinguish between apparatuses, between modules or between units and are not intended to limit the order or mutual dependence of the functions performed by these apparatuses, modules or units.

"One" and "multiple" mentioned in the present disclosure are not limiting but illustrative. It is to be understood by those skilled in the art that "one" and "multiple" are construed as "one or more" unless otherwise specified in the context.

The names of messages or information exchanged between apparatuses in embodiments of the present disclosure are illustrative and not to limit the scope of the messages or information.

Figure 1:
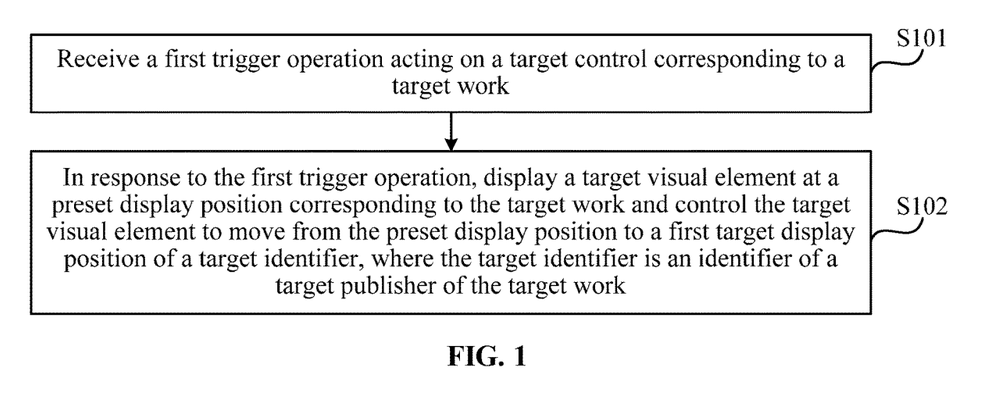
FIG. 1 is a flowchart of an interaction method according to an embodiment of the present disclosure.

FIG. 1 is a flowchart of an interaction method according to an embodiment of the present disclosure. The method may be performed by an interaction apparatus. The apparatus may be implemented in software and/or hardware and may be configured in an electronic device such as a mobile phone or a tablet computer. The interactive method provided in the embodiment of the present disclosure is applicable to a scenario where feedback is provided on the work. As shown in FIG. 1, the interaction method provided in this embodiment may include the steps below.

In S101, a first trigger operation acting on a target control corresponding to a target work is received.

The target control is a control corresponding to a work (for example, the work may be creation such as a video, an article, audio, or the like) and may be an existing control of the work. For example, the existing control may be a like control, a collection control, a comment control, and so on that are already used on the content recommendation page or content detail page of multiple types of applications and corresponds to the work displayed on the page. The target control may also be a control for a user to express an attitude in addition to the preceding like control, collection control, and comment control. Correspondingly, in the case where the target control is a newly set control, the first trigger operation may be any operation that triggers the control. In the case where the target control is the like control, the first trigger operation may be a long press operation, a consecutive click operation, or a drag operation that acts on the like control and is not used to switch the target control to a state (a second display state such as a liked state or a third display state such as an unliked state) other than a first display state, where the long press operation may be understood as a click operation with a duration greater than or equal to a first time threshold, and the consecutive click operation may be understood as a click operation with a single click duration less than a first duration threshold, a click duration of two adjacent clicks less than or equal to a second duration threshold, and the number of clicks greater than a preset number threshold. The first duration threshold, the second duration threshold, and the preset number threshold may be set by a developer as required. For example, the first time threshold may be set to 1 s, 2 s, or the like, the second time threshold may be set to 0.5 s or the like, and the preset number may be set to 2, 3, or the like. The target work is the work to which the target control triggered by the first trigger operation belongs. The case where the target control is the like control and the first trigger operation is the long press operation is used as an example below.

Figure 2:
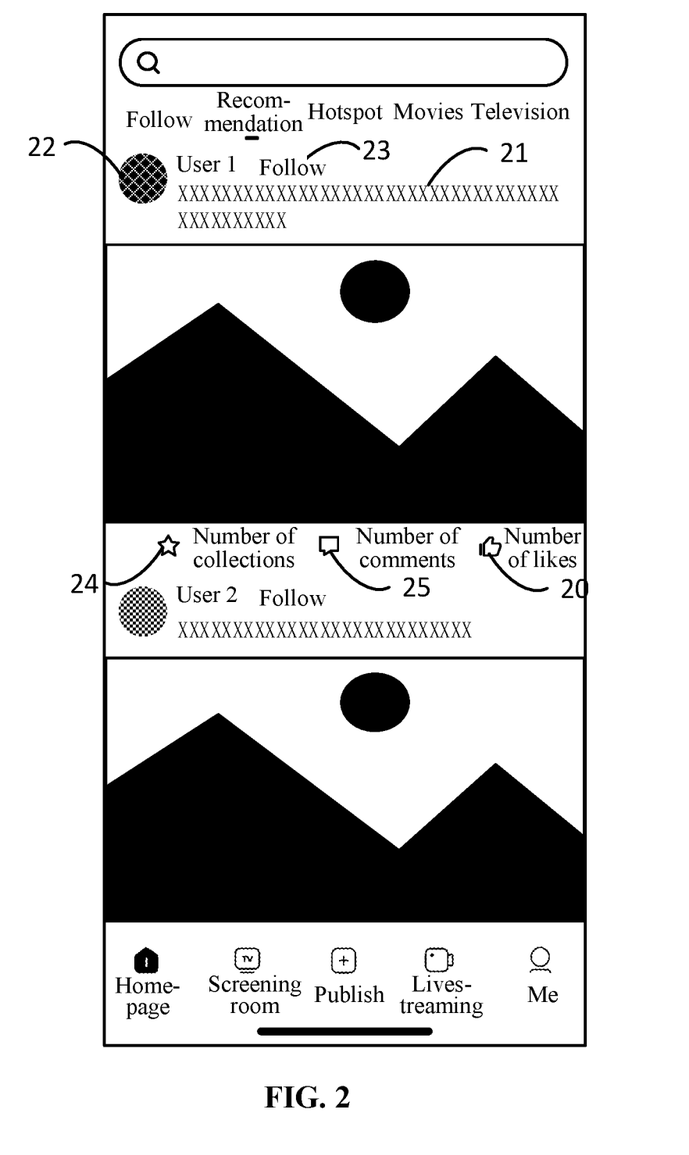
FIG. 2 is a schematic diagram of a display state of a like control according to an embodiment of the present disclosure.

As shown in FIG. 2 (the case where the user has not yet liked the target work is used as an example), the electronic device displays at least one work and a like control 20 corresponding to each work and may also display a title 21 of each work, a user name, an avatar 22, and corresponding following control 23 of a publisher of each work (for example, the publisher may be a creator of each work), and at least one of a collection control 24 or a comment control 25 corresponding to each work. The user may long press the like control 20 of the work when the user wants to express the stronger affection for the work than a like. Correspondingly, when detecting that the user long presses the like control 20 of the work, the electronic device determines that the first trigger operation acting on the target control of the target work is received, determines the like control 20 as the target control, and determines the work as the target work.

In S102, in response to the first trigger operation, a target visual element is displayed at a preset display position corresponding to the target work and the target visual element is controlled to move from the preset display position to a first target display position of a target identifier, where the target identifier is an identifier of a target publisher of the target work.

The target visual element may be a graphic or a special effect (including a prop). For example, the target visual element may be a like gesture (for example, a like gesture with a tilt), a rocket graphic, or a heart shape that differs from the display state of the like control during a normal like and may be set by the target publisher or developer of the target work. The target publisher may be a publisher of the target work. Correspondingly, the target identifier may include at least one of an image, a copywriting, or an icon of the target publisher, for example, the target identifier is the avatar of the target publisher. The case where the target identifier is the avatar of the target publisher is used as an example below. The first target display position may be a display position in a display region where the target identifier is located. The preset display position and the first target display position may be set by the developer or set by the publisher of the target work as required so as to match the requirement of the publisher, enhance the design space of the publisher, improve the publishing experience of the publisher, and increase the motivation of the user to publish the work. For example, the preset display position may be a position other than the first target display position in the display region where the target work is located, such as a position where the target control is located or a position around the target control, so that the user can timely detect the response of the electronic device to the first trigger operation performed by the user and the user experience can be improved. The first target display position may be a position where the avatar of the target publisher is located or a position around the avatar of the target publisher so that the interaction effect between the user and the target publisher can be improved.

Figure 4:
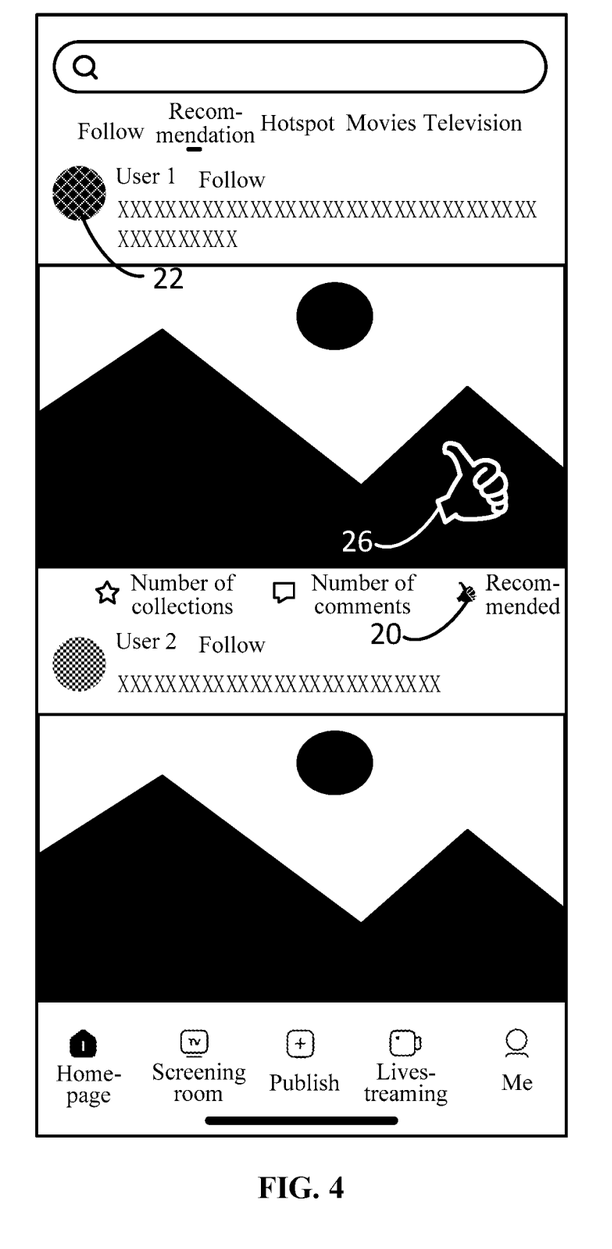
FIG. 4 is a schematic diagram of a display state of another like control according to an embodiment of the present disclosure.

As shown in FIG. 4, when receiving the first trigger operation acting on the like control 20 of the target work, in response to the first trigger operation, the electronic device displays a target visual element 26 at the preset display position corresponding to the target work and controls the target visual element 26 to move from the preset display position to the display position of the avatar 22 of the target publisher (the case where the target visual element 26 is the like gesture with a tilt is used as an example in FIG. 4).

In an embodiment, when receiving the first trigger operation, the electronic device may also switch the current display state of the target control to the display state corresponding to the first trigger operation, that is, the electronic device displays the target control in the display state corresponding to the first trigger operation so that the user can determine whether the user has performed an operation (such as giving a like) on the target work to which the target control belongs according to the display state of the target control, thereby improving the user experience. The interaction method provided in this embodiment further includes in response to the first trigger operation, switching a current display state of the target control to a first display state corresponding to the first trigger operation. The first display state may be understood as a display state of the target control corresponding to the first trigger operation. The case where the first display state is a recommended state is used as an example for the description below.

Figure 3:
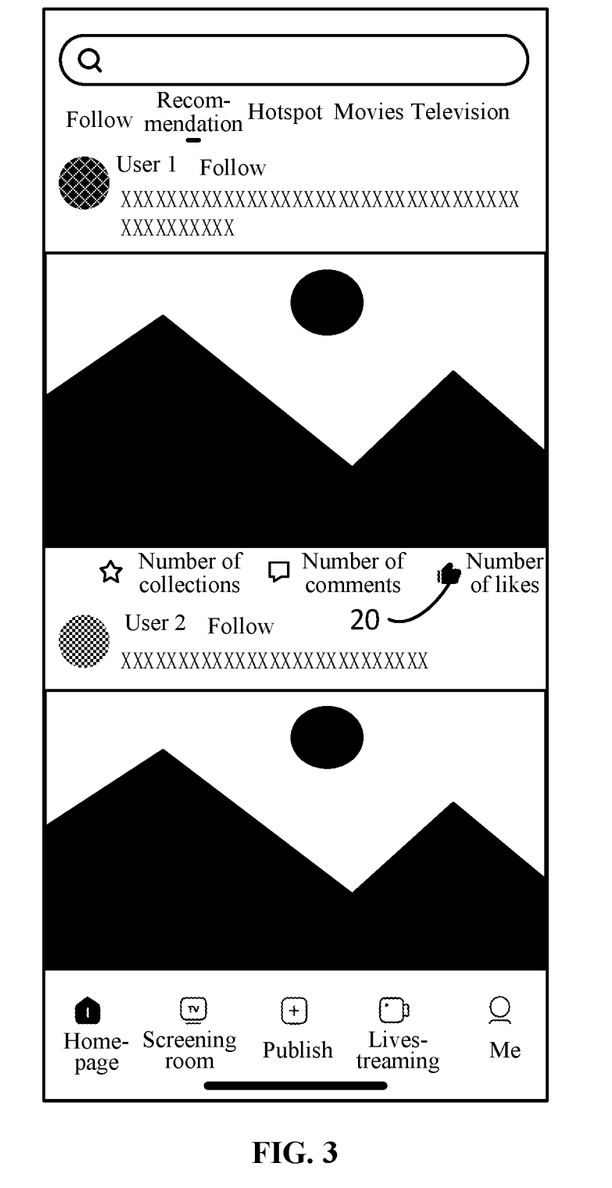
FIG. 3 is a schematic diagram of a display state of another like control according to an embodiment of the present disclosure.

In the preceding embodiment, in the case where the target control is the like control, the like control 20 may have three display states: the unliked state (as shown in FIG. 2), a liked but not recommended state (as shown in FIG. 3), and the recommended state (as shown in FIG. 4). Therefore, when detecting the first trigger operation performed by the user on the like control 20 of the target work, the electronic device may switch the current display state of the like control 20 to the recommended state, for example, the electronic device determines whether the current display state of the like control 20 is the recommended state and in the case where the electronic device determines that the current display state of the like control 20 is not the recommended state, switches the current display state to the recommended state.

In this embodiment, the switching timing of switching the current display state of the target control to the first display state may be set flexibly according to requirements. For example, the operation of switching the current display state of the target control to the first display state may be performed in parallel or series with the operation of displaying the target visual element or the operation of controlling the target visual element to move, that is, the electronic device may switch the current display state of the target control to the first display state while displaying the target visual element or while controlling the target visual element to move to the first target display position. Alternatively, the electronic device may switch the current display state of the target control to the first display state before displaying the target visual element, before controlling the target visual element to move to the first target display position, or after controlling the target visual element to move to the first target display position. Alternatively, when detecting the trigger end of the first trigger operation or determining the trigger operation to be the first trigger operation, for example, when detecting the trigger end of the long press operation acting on the target control or detecting that the duration of the press operation acting on the target control reaches the first time threshold, the electronic device switches the current display state of the target control to the first display state, which is not limited in this embodiment.

In this embodiment, in response to the first trigger operation, the current display state of the target control may not be considered. For example, in the case where the trigger operation is determined to be the first trigger operation, regardless of the current display state of the target control, the target visual element is displayed and controlled to move to the first target display position, and in the case where the current display state of the target control is not the first display state, the current display state of the target control is switched to the first display state. Alternatively, the current display state of the target control may be considered; only in the case where the current display state of the target control is not the first display state or only in the case where the current display state of the target control is the third display state (such as the unliked state), a response is made to the received first trigger operation, and in the case where the current display state of the target control is the first display state or only in the case where the current display state of the target control is not the third display state, a response is not made to the received first response operation.

In this embodiment, to avoid the abrupt display of the target visual element and to improve the entertainment of the user when performing the interaction, after the first trigger operation is received, a generated special effect corresponding to the target visual element may be displayed so as to generate the target visual element on the display page. The interaction method provided in this embodiment further includes in response to the first trigger operation, displaying a generated special effect corresponding to the target visual element. The generated special effect of the target visual element may be understood as a display special effect of the target visual element and may be a dynamic special effect (such as animation) or a static special effect (such as a picture), such as a dynamic special effect of multiple regular or irregular shapes coming together at the preset display position and popping up the target visual element, a dynamic special effect of gradually reducing the transparency of the target visual element to gradually reveal the target visual element, or a preset generated picture, which are not limited in this embodiment.

In an embodiment, after the target visual element is controlled to move from the preset display position to the first target display position of the target identifier, the method further includes stopping displaying the target visual element and executing a feedback event of the target publisher.

In the preceding embodiment, after the target visual element is controlled to move to the first target display position, the feedback event of the target publisher may be executed so as to express the gratitude of the target publisher to the user, thereby improving the fun and enthusiasm of the user when performing the interaction and improving the interaction experience of the user.

The feedback event of the target publisher may be understood as an event used by the target publisher to provide feedback to the first trigger operation of the user, such as displaying a graphic or picture used by the target publisher to provide feedback to the first trigger operation of the user, displaying the animation or special effect used by the target publisher to provide feedback to the first trigger operation of the user, and/or playing the audio used by the target publisher to provide feedback to the first trigger operation of the user, which are not limited in this embodiment.

For example, when receiving the first trigger operation, the electronic device displays the target visual element, controls the target visual element to move to the first target display position, switches the current display state of the target control to the first display state and after controlling the target visual element to move to the first target display position, the electronic device stops displaying the target visual element and executes the feedback event of the target publisher to provide feedback to the first trigger operation of the user.

In the interaction method provided in this embodiment, the first trigger operation acting on the target control corresponding to the target work is received; and in response to the first response operation, the target visual element corresponding to the target work is displayed at the preset display position corresponding to the target work, and the target visual element is controlled to move from the preset display position to the first target display position of the identifier of the target publisher of the target work. In this embodiment, the preceding technical solutions are adopted so that a new interaction manner is provided for the user and the fun of the user when performing the interaction can be improved, thereby improving the interaction frequency and experience of the user.

Figure 5:
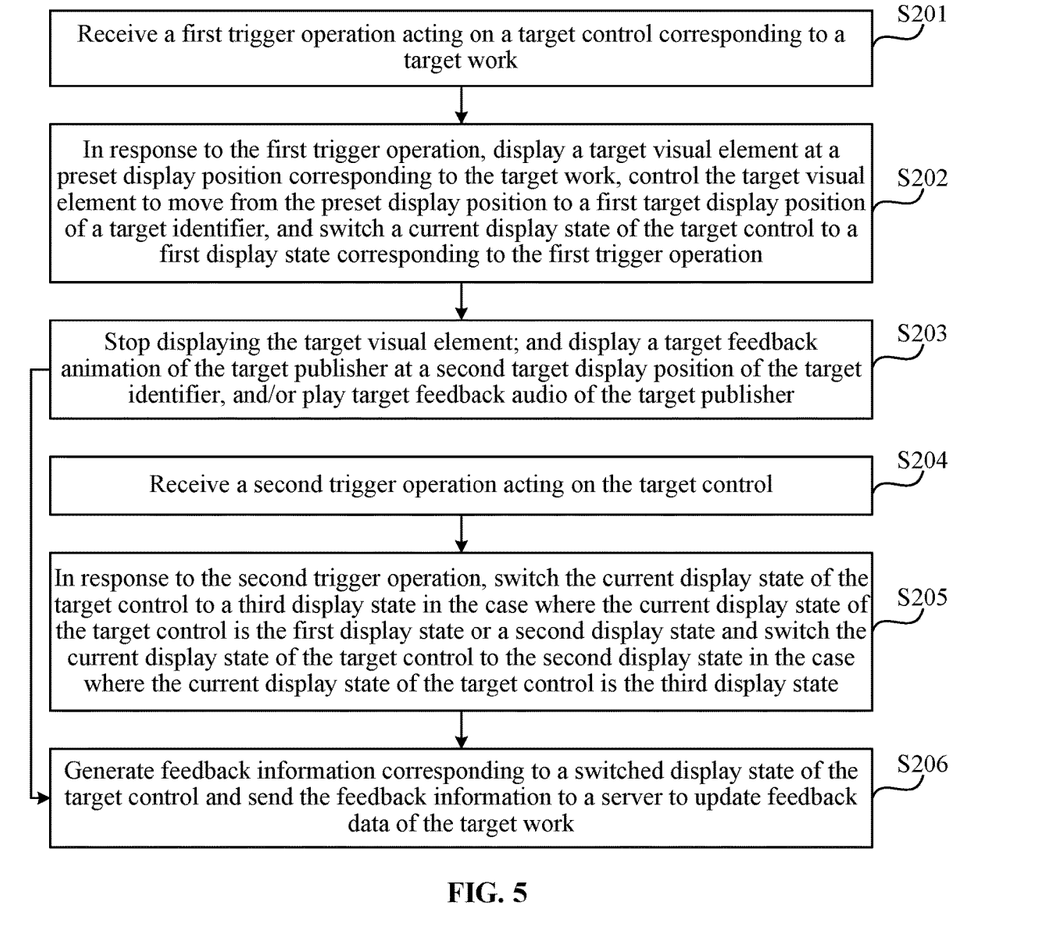
FIG. 5 is a flowchart of another interaction method according to an embodiment of the present disclosure.

FIG. 5 is a flowchart of another interaction method according to an embodiment of the present disclosure. A solution in this embodiment may be combined with one or more optional solutions in the preceding embodiment. Optionally, the step of executing the feedback event of the target publisher includes displaying a target feedback animation of the target publisher at a second target display position of the target identifier; and/or playing target feedback audio of the target publisher.

Optionally, the interaction method provided in this embodiment may further include receiving a second trigger operation acting on the target control; and in response to the second trigger operation, switching the current display state of the target control to a third display state in the case where the current display state of the target control is the first display state or a second display state and switching the current display state of the target control to the second display state in the case where the current display state of the target control is the third display state.

Accordingly, as shown in FIG. 5, the interaction method provided in this embodiment may include the steps below.

In S201, a first trigger operation acting on a target control corresponding to a target work is received.

In S202, in response to the first trigger operation, a target visual element is displayed at a preset display position corresponding to the target work, the target visual element is controlled to move from the preset display position to a first target display position of a target identifier, and a current display state of the target control is switched to a first display state corresponding to the first trigger operation, where the target identifier is an identifier of a target publisher of the target work.

In S203, the display of the target visual element is stopped; and a target feedback animation of the target publisher is displayed at a second target display position of the target identifier, and/or target feedback audio of the target publisher is played. S206 is performed.

The second target display position may be understood as a position in the display region where the target identifier is located and may be the same as or different from the first target display position. The second target display position may be set by the developer or by the publisher of the target work as required so as to match the requirement of the publisher, enhance the design space of the publisher, and improve the publishing experience of the publisher and the motivation of the user to publish the work. The target feedback animation may be understood as the feedback animation of the target publisher, and the target feedback audio may be understood as the feedback audio of the target publisher. The target feedback animation or the target feedback audio may be either the feedback animation/feedback audio set by the developer or the feedback animation/feedback audio imported or selected by the target publisher.

In this embodiment, feedback to the first trigger operation of the user may be provided through the target feedback animation and/or the target feedback audio to express the gratitude of the target publisher. The electronic device controls the target visual element to move to the first target display position of the target identifier, stops displaying the target visual element after the target visual element moves to the first target display position, and displays the target feedback animation of the target publisher and/or plays the target feedback audio of the target publisher at the second target display position of the target identifier. For example, in the case where the target feedback animation and the target feedback audio of the target publisher exist, at least one of displaying the target feedback animation or playing the target feedback audio is performed according to the setting of the target publisher or the developer; in the case where only the target feedback animation of the target publisher exists, the target feedback animation is displayed; and in the case where only the target feedback audio of the target publisher exists, the target feedback audio is played.

In an embodiment, before the target visual element is displayed at the preset display position corresponding to the target work, the method further includes at least one of the following: acquiring a feedback animation set by the target publisher or acquiring a feedback animation containing information about a current activity as the target feedback animation of the target publisher; acquiring feedback audio set by the target publisher or acquiring feedback audio containing the information about the current activity as the target feedback audio of the target publisher; or acquiring a visual element set by the target publisher or acquiring a visual element corresponding to the information about the current activity as the target visual element.

In the preceding embodiment, the feedback animation/feedback audio/visual element set by the target publisher may be selected as the target feedback animation/target feedback audio/target visual element so that the executed feedback event is more in line with the wishes of the publisher of the target work; or the feedback animation/feedback audio/visual element corresponding to the information about the current activity may be selected as the target feedback animation/target feedback audio/target visual element, so as to ensure that the user can be informed of the currently performed activity and participate in the activity in time.

The feedback animation/feedback audio/visual element set by the target publisher may be the feedback animation/feedback audio/visual element imported by the target publisher or the feedback animation/feedback audio/visual element selected by the target publisher among multiple feedback animations/feedback audio/visual elements provided by the developer. The information about the current activity may be the relevant information about the currently performed activity (for example, a festival, a marketing event, or another activity). Correspondingly, the feedback animation/feedback audio/visual element corresponding to the information about the current activity may be the feedback animation/feedback audio/visual element containing an information element of the information about the current activity. For example, assuming that the current festival is Christmas, the feedback animation/feedback audio/visual element containing the Christmas element may be selected as the target feedback animation/target feedback audio/target visual element.

For example, when the target feedback animation/target feedback audio/target visual element is determined, whether the target publisher sets the feedback animation/feedback audio/visual element may be determined first. If the target publisher sets the feedback animation/feedback audio/visual element, the feedback animation/feedback audio/visual element set by the target publisher is acquired as the target feedback animation/target feedback audio/target visual element. If the target publisher does not set the feedback animation/feedback audio/visual element, whether there is currently an ongoing activity is determined. If there is currently an ongoing activity, the feedback animation/feedback audio/visual element corresponding to the information about the current activity is acquired as the target feedback animation/target feedback audio/target visual element. If there is currently no ongoing activity, the default feedback animation/feedback audio/visual element set by the developer may be selected as the target feedback animation/target feedback audio/target visual element.

In S204, a second trigger operation acting on the target control is received.

In S205, in response to the second trigger operation, the current display state of the target control is switched to a third display state in the case where the current display state of the target control is the first display state or a second display state and the current display state of the target control is switched to the second display state in the case where the current display state of the target control is the third display state.

The second trigger operation may be a trigger operation acting on the target control other than the first trigger operation, such as a trigger operation with a duration less than the first duration threshold and where no second click is detected within the second duration threshold or where the number of consecutive clicks is less than the preset number threshold. For example, in the case where the first trigger operation is the long press operation, the second trigger operation may be the click operation. The first display state, the second display state, and the third display state may be three different display states of the target control. For example, the case where the target control is the like control is used as an example, the first display state may be the recommended state of the like control (as shown in FIG. 4), the second display state may be the liked but not recommended state of the like control (as shown in FIG. 3), and the third display state may be the unliked state of the like control (as shown in FIG. 2).

In this embodiment, the user may instruct the electronic device to switch the current display state of the target control by performing different trigger operations (such as the first trigger operation or the second trigger operation). For example, in the case where the target control is in the second display state or the third display state, the user may instruct the electronic device to switch the target control to the first display state by performing the first trigger operation. In the case where the target control is in the first display state or the second display state, the user may instruct the electronic device to switch the target control to the third display state by performing the second trigger operation. In the case where the target control is in the third display state, the user may instruct the electronic device to switch the target control to the second display state by performing the second trigger operation.

The case where the target control is the like control, the first trigger operation is the long press operation, and the second trigger operation is the click operation is used as an example. In the case where the like control is in the unliked state, the user may give a like to the target work by clicking on the like control to express the affection for the target work corresponding to the like control and may recommend the target work by long pressing the like control to express the affection stronger than a like. Correspondingly, when detecting that the trigger operation of the user to give a like to the target work, the electronic device may switch the current display state of the like control from the unliked state to the liked state, and when detecting the trigger operation of the user to recommend the target work, the electronic device may switch the current display state of the like control from the unliked state to the recommended state. In the case where the like control is in the liked/recommended state, the user may cancel the like/recommendation for the target work by clicking on the like control. Correspondingly, when detecting the trigger operation of the user to cancel the like/recommendation for the target work, the electronic device may switch the current display state of the like control from the liked/recommended state to the unliked state. In the case where the like control is in the liked state, the user may recommend the target work by long pressing the like control to express the affection stronger than a like. Correspondingly, when detecting the trigger operation of the user to recommend the target work, the electronic device may switch the current display state of the like control from the liked state to the recommended state.

In S206, feedback information corresponding to a switched display state of the target control is generated and the feedback information is sent to a server so as to update feedback data of the target work.

Although the case where S201 to S203 and S204 and S205 are performed in parallel is used as an example in this embodiment, it is to be understood by those skilled in the art that S204 and S205 may be performed before or after S201 to S203. Correspondingly, the operation of the electronic device sending a feedback message corresponding to the switched display state of the target control to the server after switching the display state of the target control in response to the second trigger operation may be performed before or after the operation of the electronic device sending a feedback message corresponding to the switched display state to the server after switching the display state of the target control in response to the first trigger operation, which may be determined according to the order of the time when the first trigger operation is received and the time when the second trigger operation is received. That is, if the user performs the first trigger operation first and then performs the second trigger operation, when detecting the first trigger operation of the user, the electronic device may perform S201 to S203 and S206, and when detecting the second trigger operation of the user, the electronic device performs S204 to S206. If the user performs the second trigger operation first and then performs the first trigger operation, when detecting the second trigger operation of the user, the electronic device may perform S204 to S206, and when detecting the first trigger operation of the user, the electronic device performs S201 to S203 and S206.

In the interaction method provided in this embodiment, the target control is switched to different states according to different trigger operations of the user, and the target feedback animation and/or the target feedback audio of the target publisher is played after the target visual element is controlled to move to the first target display position so that switching between different display states of the target control and interaction between the user and the publisher of the work can be achieved, and the fun of the user when performing the interaction can be improved.

Figure 6:
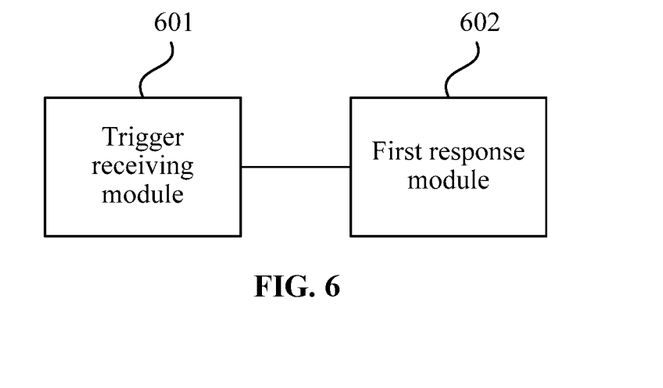
FIG. 6 is a block diagram of an interaction apparatus according to an embodiment of the present disclosure.

FIG. 6 is a block diagram of an interaction apparatus according to an embodiment of the present disclosure. The apparatus may be implemented in software and/or hardware and may be configured in an electronic device such as a mobile phone or a tablet computer. The apparatus can perform an interaction method to perform the interaction. As shown in FIG. 6, the interaction apparatus provided in the embodiment may include a trigger receiving module 601 and a first response module 602.

The trigger receiving module 601 is configured to receive a first trigger operation acting on a target control corresponding to a target work. The first response module 602 is configured to, in response to the first trigger operation, display a target visual element at a preset display position corresponding to the target work and control the target visual element to move from the preset display position to a first target display position of a target identifier, where the target identifier is an identifier of a target publisher of the target work.

In the interaction apparatus provided in this embodiment, the trigger receiving module 601 receives the first trigger operation acting on the target control corresponding to the target work, and in response to the first response operation, the first response module 602 displays the target visual element corresponding to the target work at the preset display position corresponding to the target work and controls the target visual element to move from the preset display position to the first target display position of the identifier of the target publisher of the target work. In this embodiment, the preceding technical solutions are adopted so that a new interaction manner is provided for the user and the fun of the user when performing the interaction can be improved, thereby improving the interaction frequency and experience of the user.

Optionally, the first response module 602 includes a state switching unit configured to, in response to the first trigger operation, switch a current display state of the target control to a first display state corresponding to the first trigger operation.

Optionally, the first response module 602 includes a special effect displaying unit configured to, in response to the first trigger operation, display a generated special effect corresponding to the target visual element.

Optionally, the first response module 602 includes a feedback unit configured to, after the target visual element is controlled to move from the preset display position to the first target display position of the target identifier, stop displaying the target visual element and execute a feedback event of the target publisher.

Optionally, the feedback unit is configured to, after the target visual element is controlled to move from the preset display position to the first target display position of the target identifier, stop displaying the target visual element; and display a target feedback animation of the target publisher at a second target display position of the target identifier, and/or play target feedback audio of the target publisher.

Optionally, the first response module 602 further includes an acquisition unit configured to, before the target visual element is displayed at the preset display position corresponding to the target work, perform at least one of the following: acquiring a feedback animation set by the target publisher or acquiring a feedback animation containing information about a current activity as the target feedback animation of the target publisher; acquiring feedback audio set by the target publisher or acquiring feedback audio containing the information about the current activity as the target feedback audio of the target publisher; or acquiring a visual element set by the target publisher or acquiring a visual element corresponding to the information about the current activity as the target visual element.

Optionally, the interaction apparatus provided in this embodiment may further include a second response module configured to receive a second trigger operation acting on the target control; and in response to the second trigger operation, switch the current display state of the target control to a third display state in the case where the current display state of the target control is the first display state or a second display state and switch the current display state of the target control to the second display state in the case where the current display state of the target control is the third display state.

Optionally, the interaction apparatus provided in this embodiment may further include an information sending module configured to generate feedback information corresponding to a switched display state of the target control.

The interaction apparatus provided in the embodiment of the present disclosure can perform the interaction method provided in any embodiment of the present disclosure and has function modules and effects corresponding to the interaction method performed. For technical details not described in detail in this embodiment, reference may be made to the interaction method provided in any embodiment of the present disclosure.

Figure 7:
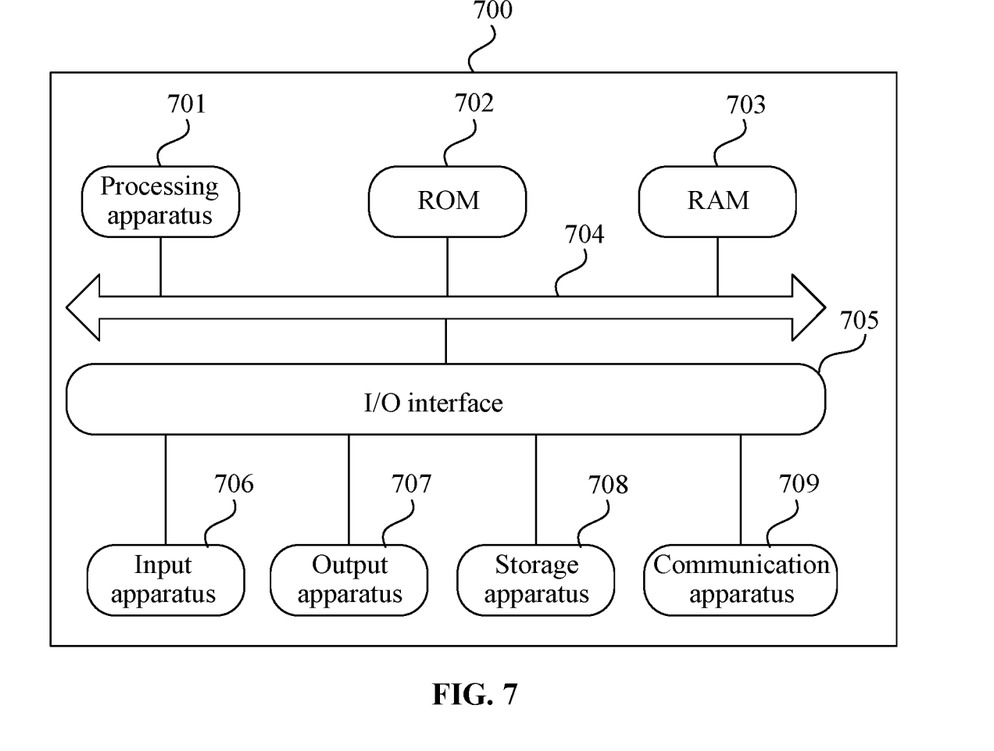
FIG. 7 is a structural diagram of an electronic device according to an embodiment of the present disclosure.

Referring to FIG. 7, FIG. 7 shows a structural diagram of an electronic device (such as a terminal device) 700 suitable for implementing the embodiments of the present disclosure. The terminal device in the embodiments of the present disclosure may include, but is not limited to, a mobile terminal such as a mobile phone, a laptop, a digital broadcast receiver, a personal digital assistant (PDA), a portable Android device (PAD), a portable media player (PMP) and an in-vehicle terminal (such as an in-vehicle navigation terminal) and a stationary terminal such as a digital television (TV) and a desktop computer. The electronic device shown in FIG. 7 is an example and is not intended to limit the function and use range of the embodiment of the present disclosure.

As shown in FIG. 7, the electronic device 700 may include a processing apparatus 701 (such as a central processing unit or a graphics processing unit). The processing apparatus 701 may perform various types of appropriate operations and processing according to a program stored in a read-only memory (ROM) 702 or a program loaded from a storage apparatus 708 to a random-access memory (RAM) 703. The RAM 703 also stores various programs and data required for the operation of the electronic device 700. The processing apparatus 701, the ROM 702, and the RAM 703 are connected to each other through a bus 704. An input/output (I/O) interface 705 is also connected to the bus 704.

Generally, the following apparatuses may be connected to the I/O interface 705: an input apparatus 706 such as a touch screen, a touchpad, a keyboard, a mouse, a camera, a microphone, an accelerometer, or a gyroscope; an output apparatus 707 such as a liquid crystal display (LCD), a speaker, or a vibrator; the storage apparatus 708 such as a magnetic tape or a hard disk; and a communication apparatus 709. The communication apparatus 709 may allow the electronic device 700 to perform wireless or wired communication with other devices to exchange data. Although FIG. 7 shows the electronic device 700 having various apparatuses, it is not required to implement or include all the apparatuses shown. Alternatively, more or fewer apparatuses may be implemented or included.

According to an embodiment of the present disclosure, the process described above with reference to flowcharts may be implemented as a computer software program. For example, a computer program product is included in the embodiment of the present disclosure. The computer program product includes a computer program carried on a non-transitory computer-readable medium. The computer program includes program codes for performing the methods shown in the flowcharts. In such embodiments, the computer program may be downloaded and installed from a network through the communication apparatus 709, installed from the storage apparatus 708, or installed from the ROM 702. When the computer program is executed by the processing apparatus 701, the preceding functions defined in the methods in embodiments of the present disclosure are implemented.

The preceding computer-readable medium of the present disclosure may be a computer-readable signal medium or a computer-readable storage medium or any combination thereof. For example, the computer-readable storage medium may be, but is not limited to, an electrical, magnetic, optical, electromagnetic, infrared or semiconductor system, apparatus or device or any combination thereof. Examples of the computer-readable storage medium may include, but are not limited to, an electrical connection having one or more wires, a portable computer disk, a hard disk, a RAM, a ROM, an erasable programmable read-only memory (EPROM), a flash memory, an optical fiber, a portable compact disc read-only memory (CD-ROM), an optical memory device, a magnetic memory device, or any suitable combination thereof. In the present disclosure, the computer-readable storage medium may be any tangible medium including or storing a program that can be used by or in connection with an instruction execution system, apparatus or device. In the present disclosure, the computer-readable signal medium may include a data signal propagated on a baseband or as part of a carrier, where computer-readable program codes are carried in the data signal. The data signal propagated in this manner may be in multiple forms and includes, but is not limited to, an electromagnetic signal, an optical signal, or any suitable combination thereof. The computer-readable signal medium may also be any computer-readable medium except the computer-readable storage medium. The computer-readable signal medium may send, propagate or transmit a program used by or in connection with an instruction execution system, apparatus or device. Program codes included on the computer-readable medium may be transmitted by any suitable medium, including, but not limited to, a wire, an optical cable, a radio frequency (RF), or any suitable combination thereof.

In some embodiments, clients and servers may communicate using any network protocol currently known or developed in the future, such as a Hypertext Transfer Protocol (HTTP), and may be interconnected via any form or medium of digital data communication (for example, a communication network). Examples of the communication network include a local area network (LAN), a wide area network (WAN), an inter-network (for example, the Internet), a peer-to-peer network (for example, an ad hoc network), and any network currently known or developed in the future.

The preceding computer-readable medium may be included in the preceding electronic device or may exist alone without being assembled into the electronic device.

The computer-readable medium carries one or more programs. When the one or more programs are executed by the electronic device, the electronic device performs the following: receiving a first trigger operation acting on a target control corresponding to a target work; and in response to the first trigger operation, displaying a target visual element at a preset display position corresponding to the target work and controlling the target visual element to move from the preset display position to a first target display position of a target identifier, where the target identifier is an identifier of a target publisher of the target work.

Computer program codes for executing operations in the present disclosure may be written in one or more programming languages or a combination thereof. The preceding programming languages include, but are not limited to, an object-oriented programming language such as Java, Smalltalk or C++ and may also include a conventional procedural programming language such as C or a similar programming language. The program codes may be executed entirely on a user computer, executed partly on a user computer, executed as a stand-alone software package, executed partly on a user computer and partly on a remote computer, or executed entirely on a remote computer or a server. In the case where the remote computer is involved, the remote computer may be connected to the user computer through any type of network including a LAN or a WAN or may be connected to an external computer (for example, through the Internet provided by an Internet service provider).

The flowcharts and block diagrams in the drawings show the possible architecture, function, and operation of the system, method, and computer program product according to the embodiments of the present disclosure. In this regard, each block in the flowcharts or block diagrams may represent a module, program segment or part of codes, where the module, program segment or part of codes includes one or more executable instructions for implementing specified logical functions. It is to be noted that in some alternative implementations, the functions marked in the blocks may occur in an order different from that marked in the drawings. For example, two successive blocks may, in practice, be executed substantially in parallel or executed in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The name of a module is not intended to limit the unit itself in a certain circumstance.

The functions described above herein may be executed at least in part by one or more hardware logic components. For example, without limitation, example types of hardware logic components that can be used include a field-programmable gate array (FPGA), an application-specific integrated circuit (ASIC), an application-specific standard product (ASSP), a system-on-chip (SoC), a complex programmable logic device (CPLD), and the like.

In the context of the present disclosure, a machine-readable medium may be a tangible medium that may include or store a program for use by or in connection with an instruction execution system, apparatus or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device or any appropriate combination thereof. Examples of the machine-readable storage medium include an electrical connection according to one or more wires, a portable computer disk, a hard disk, a RAM, a ROM, an EPROM, a flash memory, an optical fiber, a CD-ROM, an optical storage device, a magnetic storage device or any appropriate combination thereof.

According to one or more embodiments of the present disclosure, example one provides an interaction method. The method includes the steps below.

A first trigger operation acting on a target control corresponding to a target work is received.

In response to the first trigger operation, a target visual element is displayed at a preset display position corresponding to the target work and the target visual element is controlled to move from the preset display position to a first target display position of a target identifier, where the target identifier is an identifier of a target publisher of the target work.

According to one or more embodiments of the present disclosure, in example two based on example one, the method further includes the step below.

In response to the first trigger operation, a current display state of the target control is switched to a first display state corresponding to the first trigger operation.

According to one or more embodiments of the present disclosure, in example three based on example one, the method further includes the step below.

In response to the first trigger operation, a generated special effect corresponding to the target visual element is displayed.

According to one or more embodiments of the present disclosure, in example four based on example one, after the target visual element is controlled to move from the preset display position to the first target display position of the target identifier, the method further includes the step below.

The display of the target visual element is stopped and a feedback event of the target publisher is executed.

According to one or more embodiments of the present disclosure, in example five based on example four, the step of executing the feedback event of the target publisher includes the steps below.

A target feedback animation of the target publisher is displayed at a second target display position of the target identifier.

Moreover/alternatively, target feedback audio of the target publisher is played.

According to one or more embodiments of the present disclosure, in example six based on example five, before the target visual element is displayed at the preset display position corresponding to the target work, the method further includes at least one of the following.

A feedback animation set by the target publisher is acquired as the target feedback animation of the target publisher or a feedback animation containing information about a current activity is acquired as the target feedback animation of the target publisher.

Feedback audio set by the target publisher is acquired as the target feedback audio of the target publisher or feedback audio containing the information about the current activity is acquired as the target feedback audio of the target publisher.

Moreover, a visual element set by the target publisher is acquired as the target visual element or a visual element corresponding to the information about the current activity is acquired as the target visual element.

According to one or more embodiments of the present disclosure, in example seven based on example two, the method further includes the steps below.

A second trigger operation acting on the target control is received.

In response to the second trigger operation, the current display state of the target control is switched to a third display state in the case where the current display state of the target control is the first display state or a second display state and the current display state of the target control is switched to the second display state in the case where the current display state of the target control is the third display state.

According to one or more embodiments of the present disclosure, in example eight based on any one of examples two to seven, the method further includes the step below.

According to one or more embodiments of the present disclosure, example nine provides an interaction apparatus. The interaction apparatus includes a trigger receiving module and a first response module.

The trigger receiving module is configured to receive a first trigger operation acting on a target control corresponding to a target work.

The first response module is configured to, in response to the first trigger operation, display a target visual element at a preset display position corresponding to the target work and control the target visual element to move from the preset display position to a first target display position of a target identifier, where the target identifier is an identifier of a target publisher of the target work.

According to one or more embodiments of the present disclosure, example ten provides an electronic device. The electronic device includes one or more processors and a memory configured to store one or more programs.

The one or more programs, when executed by the one or more processors, cause the one or more processors to perform the interaction method of any one of examples one to eight.

According to one or more embodiments of the present disclosure, example eleven provides a computer-readable storage medium. The storage medium stores a computer program which, when executed by a processor, causes the processor to perform the interaction method of any one of examples one to eight.

Additionally, although multiple operations are described in a particular order, it is not a must to perform these operations in this particular order or in sequential order. In a certain environment, multitasking and parallel processing may be advantageous. Similarly, although multiple implementation details are included in the preceding discussion, these should not be construed as limiting the scope of the present disclosure. Some features described in the context of separate embodiments may be implemented in combination in a single embodiment. Rather, features described in the context of a single embodiment may be implemented in multiple embodiments individually or in any suitable subcombination.

What is claimed is:

1. An interaction method, comprising:
displaying a target control and a target identifier corresponding to a target work, wherein the target identifier is an identifier of a target publisher of the target work;
receiving a first trigger operation acting on the target control corresponding to the target work; and
in response to the first trigger operation, displaying a target visual element at a preset display position and controlling the target visual element to move from the preset display position to a first target display position corresponding to the target identifier.

2. The method of claim 1, further comprising:
in response to the first trigger operation, switching a current display state of the target control to a first display state corresponding to the first trigger operation.

3. The method of claim 2, further comprising:
receiving a second trigger operation acting on the target control; and
in response to the second trigger operation, switching the current display state of the target control to a third display state in a case where the current display state of the target control is the first display state or a second display state, and switching the current display state of the target control to the second display state in a case where the current display state of the target control is the third display state.

4. The method of claim 1, further comprising:
in response to the first trigger operation, displaying a generated special effect corresponding to the target visual element.

5. The method of claim 1, wherein after the target visual element is controlled to move from the preset display position to the first target display position corresponding to the target identifier, the method further comprises:
stopping displaying the target visual element and executing a feedback event of the target publisher.

6. The method of claim 5, wherein executing the feedback event of the target publisher comprises at least one of the following:
displaying a target feedback animation of the target publisher at a second target display position corresponding to the target identifier; or
playing target feedback audio of the target publisher.

7. The method of claim 6, before the target visual element is displayed at the preset display position corresponding to the target work, the method further comprises at least one of the following:
- acquiring a feedback animation set by the target publisher or acquiring a feedback animation containing information about a current activity, and using the feedback animation as the target feedback animation of the target publisher;
- acquiring feedback audio set by the target publisher or acquiring feedback audio containing the information about the current activity, and using the feedback audio as the target feedback audio of the target publisher; or
- acquiring a visual element set by the target publisher or acquiring a visual element corresponding to the information about the current activity, and using the visual element as the target visual element.

8. An electronic device, comprising:
- at least one processor; and
- a memory configured to store at least one program;
- wherein the at least one program, when executed by the at least one processor, causes the at least one processor to perform:
- displaying a target control and a target identifier corresponding to a target work, wherein the target identifier is an identifier of a target publisher of the target work;
- receiving a first trigger operation acting on the target control corresponding to the target work; and
- in response to the first trigger operation, displaying a target visual element at a preset display position and controlling the target visual element to move from the preset display position to a first target display position corresponding to the target identifier.

9. The electronic device of claim 8, wherein the at least one processor is further configured to perform:
- in response to the first trigger operation, switching a current display state of the target control to a first display state corresponding to the first trigger operation.

10. The electronic device of claim 9, wherein the at least one processor is further configured to perform:
- receiving a second trigger operation acting on the target control; and
- in response to the second trigger operation, switching the current display state of the target control to a third display state in a case where the current display state of the target control is the first display state or a second display state, and switching the current display state of the target control to the second display state in a case where the current display state of the target control is the third display state.

11. The electronic device of claim 8, wherein the at least one processor is further configured to perform:
- in response to the first trigger operation, displaying a generated special effect corresponding to the target visual element.

12. The electronic device of claim 8, wherein after the target visual element is controlled to move from the preset display position to the first target display position corresponding to the target identifier, the at least one processor is further configured to perform:
- stopping displaying the target visual element and executing a feedback event of the target publisher.

13. The electronic device of claim 12, wherein the at least one processor is configured to execute the feedback event of the target publisher by at least one of the following:
- displaying a target feedback animation of the target publisher at a second target display position corresponding to the target identifier; or
- playing target feedback audio of the target publisher.

14. The electronic device of claim 13, before the target visual element is displayed at the preset display position corresponding to the target work, the at least one processor is further configured to perform at least one of the following:
- acquiring a feedback animation set by the target publisher or acquiring a feedback animation containing information about a current activity, and using the feedback animation as the target feedback animation of the target publisher;
- acquiring feedback audio set by the target publisher or acquiring feedback audio containing the information about the current activity, and using the feedback audio as the target feedback audio of the target publisher; or
- acquiring a visual element set by the target publisher or acquiring a visual element corresponding to the information about the current activity, and using the visual element as the target visual element.

15. A non-transitory computer-readable storage medium storing a computer program which, when executed by a processor, causes the processor to perform:
- displaying a target control and a target identifier corresponding to a target work, wherein the target identifier is an identifier of a target publisher of the target work;
- receiving a first trigger operation acting on the target control corresponding to the target work; and
- in response to the first trigger operation, displaying a target visual element at a preset display position and controlling the target visual element to move from the preset display position to a first target display position corresponding to the target identifier.

16. The non-transitory computer-readable storage medium of claim 15, wherein the processor is further configured to perform:
- in response to the first trigger operation, switching a current display state of the target control to a first display state corresponding to the first trigger operation.

17. The non-transitory computer-readable storage medium of claim 15, wherein the processor is further configured to perform:
- in response to the first trigger operation, displaying a generated special effect corresponding to the target visual element.

18. The non-transitory computer-readable storage medium of claim 15, wherein after the target visual element is controlled to move from the preset display position to the first target display position corresponding to the target identifier, the processor is further configured to perform:
- stopping displaying the target visual element and executing a feedback event of the target publisher.

19. The non-transitory computer-readable storage medium of claim 18, wherein the processor is configured to execute the feedback event of the target publisher by at least one of the following:
- displaying a target feedback animation of the target publisher at a second target display position corresponding to the target identifier; or
- playing target feedback audio of the target publisher.

20. The non-transitory computer-readable storage medium of claim 19, before the target visual element is displayed at the preset display position corresponding to the target work, the processor is further configured to perform at least one of the following:

acquiring a feedback animation set by the target publisher or acquiring a feedback animation containing information about a current activity, and using the feedback animation as the target feedback animation of the target publisher;

acquiring feedback audio set by the target publisher or acquiring feedback audio containing the information about the current activity, and using the feedback audio as the target feedback audio of the target publisher; or acquiring a visual element set by the target publisher or acquiring a visual element corresponding to the information about the current activity, and using the visual element as the target visual element.

\* \* \* \* \*